United States Patent [19]

Pierrat

[11] 3,998,112
[45] Dec. 21, 1976

[54] MECHANICAL DRIVES

[75] Inventor: Michel A. Pierrat, Andover, Mass.

[73] Assignee: Compudrive Corporation, Medford, Mass.

[22] Filed: Dec. 6, 1974

[21] Appl. No.: 530,224

[52] U.S. Cl. .................................................. 74/805
[51] Int. Cl.$^2$ .......................................... F16H 1/28
[58] Field of Search ............................. 74/804, 805

[56] References Cited

UNITED STATES PATENTS

| | | | |
|---|---|---|---|
| 1,770,035 | 8/1930 | Heap et al | 74/805 |
| 2,250,259 | 7/1941 | Foote, Jr. | 74/805 |
| 2,874,594 | 2/1959 | Sundt | 74/805 |
| 3,056,315 | 10/1962 | Mros | 74/805 |
| 3,144,791 | 8/1964 | Menge, Sr. | 74/804 |
| 3,192,799 | 7/1965 | Pamplin | 74/805 |
| 3,383,931 | 5/1968 | Patterson, Jr. | 74/804 X |
| 3,783,712 | 1/1974 | Colinet | 74/805 |
| R24,288 | 3/1957 | Nanni | 74/805 X |

*Primary Examiner*—Samuel Scott
*Assistant Examiner*—Lance W. Chandler
*Attorney, Agent, or Firm*—James E. Mrose

[57] ABSTRACT

A compact high-torque mechanical speed changer, which offers a very wide range of output speeds in different angular directions through selections from sets of fully-interchangeable planet and sun gear combinations, and in which one predetermined counterweighting unit provides matching for the eccentricities associated with all the planet gears of such sets, comprises two sets of planet and sun gear combinations each having a one-tooth difference in numbers of effective teeth, the two externally-toothed planet gears being coupled together angularly and being mounted for eccentric rotation relative to a supporting input crankshaft, while the associated internally-toothed sun gears are respectively fixed with the changer housing and with an output member rotatable collinearly with the input shaft. Planet-gear teeth or lobes are of epitrochoid curvature, and all of the planet gears of such sets are of the same diameter; concomitantly, the companion sun gears, which are preferably of the type involving discrete roller-pin teeth rather than continuous-curvature teeth, are of the same diameter and only the number of such rollers varies from set to set. In other dimensional respects the gear sets are substantially identical and can therefore be interchanged to effect different ratios and directional senses of input to output speeds. A counterweight offsets the input-shaft and planet-gear eccentricities, and serves any selected planet gears from such sets. The changer housing and interior mountings for gear combinations accommodate assembly of the sets, as desired, to yield various speeds and directions of output.

6 Claims, 5 Drawing Figures

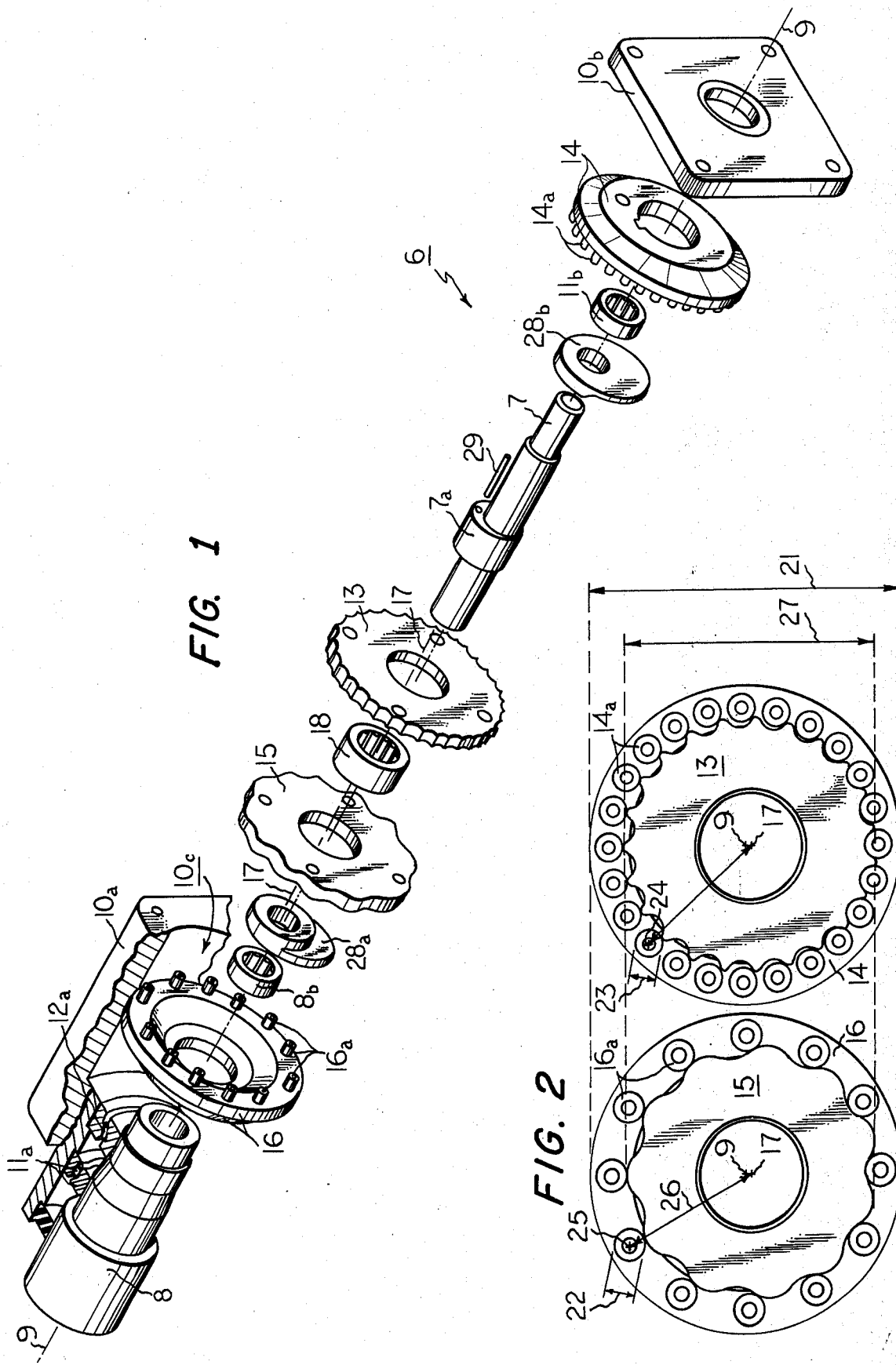

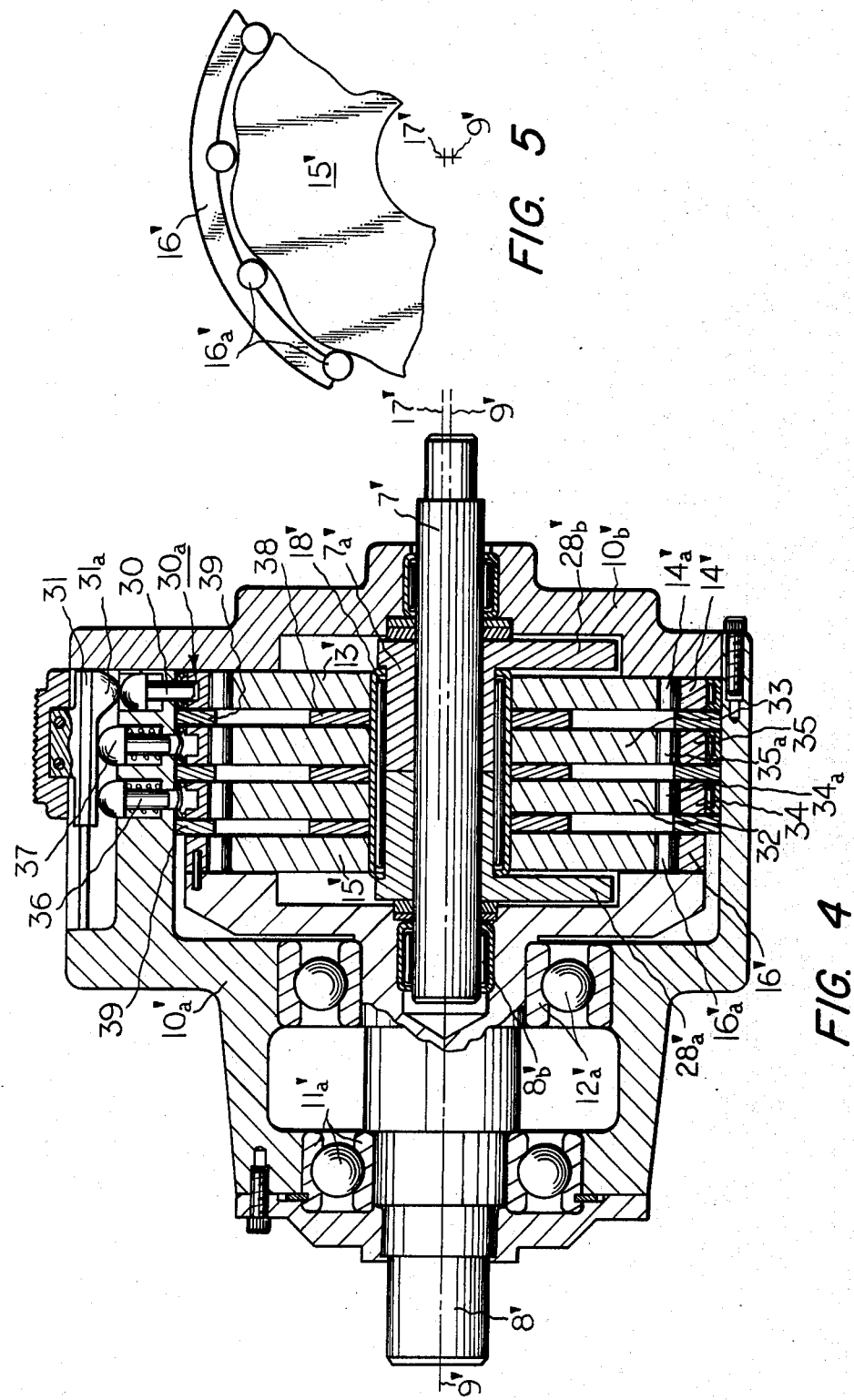

MECHANICAL DRIVES

BACKGROUND OF THE INVENTION

Speed-changing mechanisms of many different types have long been well known and have been the subject of continuing development efforts. Those with which the present invention is concerned are of a wholly mechanical positive-drive class, in which special forms of "gearing" are uniquely exploited to promote very efficient, smooth and high-torque transmissions of power, while at the same time involing only relatively small bulk, minimum wear, and but few parts which desirably move at relatively slow speeds. The gearing preferred for such purposes comprises paired internally-toothed "sun" and externally-toothed "planet" gears in which substantially-continuous rolling contacts occur between many teeth which are simultaneously in torque-transmitting engagements. So-called "geroter" gears have such characteristics, and are described in U.S. Pat. No. 1,682,563 — Hill, for example, where the interior gear has one less tooth than the exterior gear surrounding it. One such pair of gears has been described in the context of speed reduction and reversal, in U.S. Pat. No. 3,304,808 — Grant. In another speed reducer, U.S. Pat. No. 2,874,594 — Sundt, two sets or pairs of undulating-toothed gears are employed, with balls or rollers interposed between them, and with the "gears" being of different diameters. The latter fact, involving gear diameters which are different for the plural sets, represents a difficulty in relation to purposes of the present invention, and is found to be a characteristic of conventional forms of spur gearing, where different speed ratios are to be realized within the framework of like torque-transmitting capabilities. Spur gearing arrangements otherwise having some features of background pertinence to the disclosures here are believed to appear in U.S. Pat. No. 2,108,384 — Moisy, and U.S. Pat. No. 3,056,315 — Mros, and U.S Pat. No. 3,429,393 — Lorence, and U.S. Pat. No. 2,667,089 — Gregory, and U.S. Pat. No. 2,972,910 — Menge. Further, my own U.S. Pat. No. 3,574,489 discloses certain orbital drives in which the gearing is of configurations akin to those preferred for the present purposes.

A form of hitherto-known gearing which lends itself especially well to uses in the mechanical drives of this invention includes an internal planet gear having "cycloidal" shape teeth or lobes of epitrochoid curvature cooperating with a surrounding external sun gear wherein the teeth are in the form of cylindrical pins or rollers and exceed by one the number of teeth of the planet gear. My improved and unusual mechanical drives feature an interchangeability of gearing sets, and related wide range of selectable speed changes, which are promoted through applications of at least two sun-and-planet gear sets wherein the interchangeable planet gears have the same diameter and the same mass eccentricities, and thus remain matched with counterweighting despite their different numbers of teeth, and wherein the cooperating sun gears are likewise all of the same diameter and have their teeth conveniently disposed at one predetermined radial distance from a central axis.

SUMMARY

A preferred speed-reducing mechanical drive in accordance with the present teachings comprises a separable housing in which in-line rotatable input and output shafts are journalled, and in which the input shaft is provided with an eccentric shoulder imparting a crankshaft characteristic for its support of a relatively-rotatable first planet gear of predetermined diameter, the teeth of said gear following an epitrochoid curvature and being in cooperative engagements with a first circular sun-gear array of rollers pinned to a disk of predetermined diameter which is fixed with the housing coaxially with the central axis of the input shaft. Also mounted on the eccentric shoulder is a second planet gear, like the first except for a different number of teeth, the two planet gears being angularly coupled for rotation together about a common eccentric axis, although being axially separable to admit of substitutions of other such gears with different numbers of teeth. A counterweight, offsetting the rotational imbalances of the eccentrically-disposed planet gears and their mounting sleeve, is locked with the input shaft, and will serve correctively not only for those specific gears but also for substitute gears of similar dimensions but differing numbers of teeth. The said second planet gear is in turn in driving engagement with a second gear disk similar to the first, and, like the first, having pinned rollers the maximum number of which for its particular patterned array exceeds by one the number of cooperating planet-gear teeth, the second gear disk being angularly coupled in driving relationship with the coaxial output shaft.

In alternative constructions, a differential action may be developed by rotating either gear disk, and a shifting of speeds may be effected by including further gear sets and selectively locking one gear disk to the exclusion of the others.

Accordingly, it is one of the objects of the present invention to provide novel and improved mechanical drives, for speed reductions and the like, which offer an unusually-wide range of speed-changing capabilities through use of but relatively few parts in a compact assembly of at least a pair of planet and sun gear sets selectable from among a substantial number of interchangeable sets offering different effective gear ratios.

Another object is to provide a unique and uncomplicated mechanical drive lending itself to low-cost manufacture and ready assembly into embodiments yielding significantly-different rotational speeds upon introduction of planet-sun gear sets selected from among a wide variety of dimensionally-interchangeable sets, without need for related changes of mechanical counterbalancing.

BRIEF DESCRIPTION OF THE DRAWINGS

Although the aspects and features of this invention which are considered to be novel are expressed in the appended claims, further details as to preferred practices and as to the further objects and features thereof may be most readily comprehended through reference to the following description of preferred embodiments taken in connection with the accompanying drawings, wherein:

FIG. 1 portrays principal components of an improved speed-reducing mechanical drive in an exploded relationship, with a main housing part being shown as a cross-sectioned fragment for purposes of clarity;

FIG. 2 provides a plan view of the two sun-and-planet gear sets involved in the drive of FIG. 1, together with related axes and diametric dimension lines;

FIG. 4 illustrates a similar drive in which shifting of gearing may be achieved via selective locking of one of the sun gears of plural gear sets, and in which the sun gear rollers are entrapped rather than pinned; and FIG. 5 is a plan view of a fragment of one of the gear sets in the drive of FIG. 4.

DESCRIPTION OF THE PREFERRED EMBODIMENTS

Figure 3:
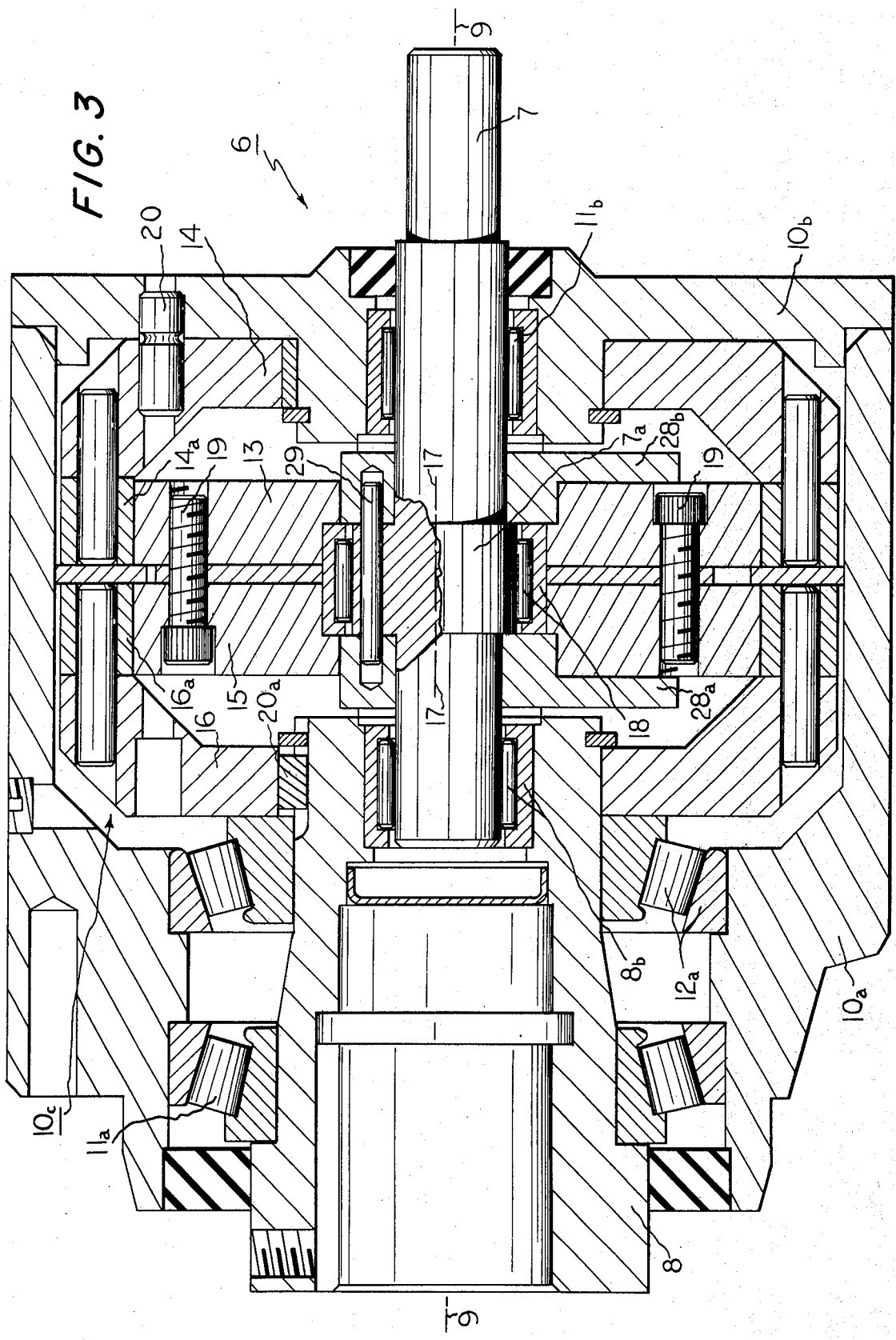
FIG. 3 is a transverse cross-section of a drive corresponding to that shown in FIG. 1.

The mechanical drive arrangement 6 appearing in FIGS. 1 and 3 is off a construction wherein an input shaft 7 is intended to be turned at a relatively high speed by a power source outside one end of a two-part housing and to effect the precisely-ratioed lower-speed rotation of an output shaft 8 disposed collinearly with it along an axis 9—9. Separable housing parts 10a and 10b are normally held together by suitable fasteners (not appearing in the drawings) and include bearing supports 11a and 12a for output shaft 8 and bearing support 11b for input shaft 7; a second bearing support, 8b, for the inner end of the input shaft 7 is disposed within the inner end of output shaft 8. Within the remaining cavity 10c defined within the joined housing parts are located two sets of sun and planet gears, one such set including the planet gear 13 having a relatively large number of teeth following an epitrochoid curvature and in cooperative meshed engagement with equally-spaced roller-type teeth 14a pinned to the sun-gear disk 14, and the other such set including the planet gear 15 having a smaller number of teeth following an epitrochoid curvature and in cooperative meshed engagement with like roller-type teeth 16a pinned to the sun-gear disk 16. In accordance with known practices, each of the planet gears is designed to have one less tooth than its cooperating encircling sun gear, such that gear 13 has one less convex lobe than there are a predetermined maximum number of rollers 14a pinned to disk 14, and gear 15 has one less convex lobe than there are a predetermined maximum number of rollers 16a pinned to disk 16. Centers of sun-gear disks 14 and 16 coincide with axis 9—9, whereas the centers of both planet gears 13 and 15 lie along an axis 17—17 which is eccentric in relation to axis 9—9 by an amount appropriate for the desired condition of rolling contact to appear between all the rollers and planet gear of each set. The latter eccentricity is established by an eccentric circular cam shoulder 7a integral with input shaft 7, the two planet gears 13 and 15 being mounted thereon with a common eccentricity via a bearing 18 which admits of their angular motion relative to that cam shoulder. Planet gears 13 and 15 are also secured together angularly by way of fasteners such as bolts 19 (FIG. 3). Sun-gear disk 14 is angularly restrained by a lock pin 20 (FIG. 3) secured with it and with housing part 10b and the resulting hitherto-known response to rotation of input shaft 7 will be a full-revolution reverse-direction rotation of planet gear 13 about its axis 17—17 each time the input shaft makes a number of turns equal to the number of convex lobes or teeth on that planet gear.

The mechanism as thus far described is substantially a counterpart of known drives, in that rotation of an input shaft, 7, simply yields a reverse-direction rotation of a planet gear, 13, about an eccentric axis with a speed reduction determined by the number of planet-gear teeth. Translation of that eccentric speed-reduced motion into a useful output rotation about an axis aligned with that of the input shaft has in turn required a further mechanism, such as one which involves small drive pins fixedly arrayed on a flange about an output shaft and mated within complementary large bore holes in the eccentrically-rotating planet gear. My use of a second planet gear, 15, fixed with the first, 13, and a second roller disk, 16, fixed with an output shaft, 8, not only effects a desired translation of eccentric rotation of the first planet gear 13 into rotation of the output shaft 8 about an axis 7—7 common to that of the input shaft, but, in addition very importantly expands the speed-reduction capabilities of the drive. For these purposes, the second roller disk 16 is angularly locked in driving relation to output shaft 8, by a key 20a or by equivalent fastening. As input shaft 7 is rotated from outside the housing, its eccentric cam shoulder 7a causes the surrounding planet gear 13 to "orbit" within the annular array of roller pins 14a fixed with the housing by way of the stationary sun gear 14. Inasmuch as said gear 13 has one less effective tooth than the sun gear 14, the former will be forced to turn angularly, about its eccentric axis 17—17, by an amount equal to the angular spacing between its adjacent teeth each time the input shaft completes one full turn; such angular motion of gear 13 is in an angular direction opposite to that of the input shaft rotation. At the same time, the second planet gear, 15, which is angularly locked with the gear 13 by bolts 19, must necessarily described an orbital path of motion angularly with gear 13, in that same opposite angular direction and by the same amount and about the same axis 17—17 of the supporting eccentric 7a. That orbital movement of the second planet gear, 15, takes place within the mating annular array of roller pins 16a of the second sun gear, 16, and the latter, which has a one-tooth difference in relation to planet gear 15, is concomitantly forced to move angularly about axis 9—9 by way of its bearing support with the output shaft 8 to which it is keyed. Speed-reduced power output is available via that output shaft, in an in-line relationship with the input applied via input shaft 7.

In addition to effecting a translation of the orbiting angular movement of the first planet-sun gear set 13 and 14 into an in-line angular output motion, the unique arrangement of the second planet-sun gear set 15 and 16 advantageously develops still further speed-changing capabilities and it advantageously utilizes gear elements which are substantially the same as those of the first set. As to the further speed-changing capabilities, it is noted that the first planet-sun gear set alone 13 and 14 can only yield a ratio of output to input angular velocities equal to the reciprocal of the number of teeth, $N_1$, on the first planet gear 13, or, $1/N_1$; moreover, the resulting angular output movement is of direction opposite to that of the input. By way of distinction, the improved arrangement of FIGS. 1 and 3 yields speed changes dictated by the relationship $$\frac{(N_1)(N_2+1)}{N_1 - N_2}$$

where $N_1$ is the number of teeth on the first planet gear, 13, and $N_2$ is the number of teeth on the second planet gear, 15. In a construction such as that illustrated, wherein the outer diameter 21 (FIG. 2) of the sun-gear companions 14 and 16 of planet gears 13 and 15 is just short of 6½ inches, one practical maximum number of rollers, 14a or 16a, is found to be eighty-eight, and either $N_1$ or $N_2$ then is a maximum of 87, inasmuch as each planet gear has one less tooth than the number of rollers on its companion sun gear. If one of the sun gears is provided with 85 rollers, such that $N_1 = 84$, and if the other has 84 rollers, such that $N_2 = 83$, then the speed-reduction ratio becomes $$\frac{(84)(83+1)}{84-83},$$

or 7056. Replacing the 84 roller sun-gear set with one having only thirteen rollers causes the speed-reduction ratio to drop to $$\frac{(84)(12+1)}{84-12},$$

or 15. Direction of rotation of the input shaft 7 and output shaft 8 is the same if the number of rollers 16a on the output sun gear 16 is smaller than the number of rollers 14a on the fixed sun gear 14, as shown; however, the output shaft direction of rotation will be reversed in relation to that of the input shaft if the number of rollers on the output sun gear 16 is greater than the number of rollers on the fixed sun gear 14, and this represents a further aspect of improvement. Many speed reductions can be effected using only a few sets of planet and sun gears; by way of one example, 10 such sets, involving 13 to 85 rollers, will provide 45 speed ratios, from 15 to 7056. In one design example, involving two like gear sets in which the sun gears are selected to have rollers from among six different numbers, ranging between 13 and 37, such that the cooperating planet gears have lobes or teeth ranging between twelve and thirty-six, thirteen different input-to-output speed ratios of selected values from 1/19.5 to 1/186 are obtainable, as follows:

| $N_1$ | $N_2$ | Speed Ratio |
| --- | --- | --- |
| 36 | 30 | 1/186 |
| 30 | 24 | 1/125 |
| 18 | 15 | 1/96 |
| 24 | 18 | 1/76 |
| 15 | 12 | 1/65 |
| 30 | 18 | 1/47.5 |
| 24 | 15 | 1/42.66 |
| 36 | 18 | 1/38 |
| 30 | 15 | 1/32 |
| 36 | 15 | 1/27.43 |
| 24 | 12 | 1/26 |
| 30 | 12 | 1/21.66 |
| 36 | 12 | 1/19.5 |

If any two of these gear sets are transposed in position, such that $N_1$ becomes $N_2$ and $N_2$ becomes $N_1$ in the foregoing listing, the direction of output rotation is reversed, with the speed ratios being reduced by one. Accordingly, only a small number of different gear sets may be exploited to achieve a wide range of speed reductions, in different directional senses; the given listing is illustrative only, and many other ratios are of course obtainable with values of $N_1$ and $N_2$ ranging between the chosen numbers from twelve through thirty-six, many of such ratios having denominators which are not whole numbers.

Optimum advantage from the aforementioned combined sets of sun-planet gears is realized through interchangeability of such sets, that is, through selected emplacements of physically-and dynamically-equivalent sets into a given structure including shafts, bearings, housing, and so forth. As has been noted hereinabove, the diameter 21 (FIG. 2) of the sun gears 14 and 16 are made the same, and, in addition, their rollers 14a and 16a are of like outer diameters, 22 and 23, and are pinned to rotate about axes, such as 24 and 25, which lie at the same radial distance, 26, from the central axis 9—9 of the sun gears. In other respects, such as general outline, internal diameter, and provisions for either keying or other fastening, these sun gears are preferably identical, and any selected one from various available sets having different numbers of rollers may therefore be introduced into the assembly to realize a predetermined speed-reduction ratio. All of the mating planet gears, such as 13 and 15, are in turn of like outer diameter, 27, and have the same axial thickness and the same inner diametric dimensions for cooperation with the eccentric bearing, 18, and the same distribution and proportioning of holes for fastening them together, and so forth. As a result of such substantial physical identity among all the various planet gears which can be selected for use in the assembly, they will all exhibit substantially the same dynamic mass unbalance in their orbital movements, and, based advantageously upon that phenomenon, both the rotational eccentricities of the cam 7a and the orbiting eccentricities of any two planet gears selected for use in the assembly will be accurately counterbalanced by one predetermined counterweighting unit. The latter unit is shown in FIGS. 1 and 3 to be constituted of two eccentric counterweighting halves 28a and 28b, which are secured together and with input shaft 7 by way of a pin fastener 29. The mass eccentricity developed about shaft 7 by these counterweighting elements is of course oriented diametrically opposite the mass eccentricity of cam shoulder 7a and the mass eccentricities of the two jointly-orbiting planet gears 13 and 15, the latter eccentricities always perforce being aligned with the eccentricity of the cam 7a about which they are mounted. It was noted hereinabove that the two eccentrically-mounted and interconnected planet gears will not only orbit inside their respective sun gears but will also rotate slowly about their common eccentric axis 17—17, at the rate of one tooth or lobe, of the one of the planet gears which reacts with the relatively fixed sun gear, for each turn of the input shaft. That reverse-direction rotation is itself a balanced rotation, however, and the counterbalancing afforded by the counterweighting 28a and 28b need only offset the mass unbalances of cam 7a as it rotates, and of planet gears 13 and 15 as they orbit, without need to account for the fact that the latter gears also rotate. Bearing 18 is involved similarly, and is embraced by the counterbalancing. With the described constructions and relative proportions of planet and sun gears in the sets from among which an appropriate pair of sets can be selected to yield a desired speed ratio and direction of output rotation, the counterbalancing needs of the assembly remain fixed and need not be varied. For that reason, a single predetermined counterweighting structure, such as elements 28a and 28b, will serve to counterbalance the assembly for whatever gear sets may be introduced. In the latter connection, it is noted that different planet gears, such as 13 and 15, having different numbers of lobes or teeth, will nevertheless exhibit substantially the same dynamic mass unbalance, or eccentricity, inasmuch as the radial distance from top to bottom of the lobes are the same and the lobes are contoured to make substantially continuous rolling contact with like-diameter rollers spaced equi-angularly about and at the same radial distance from the central axis of a mating sun gear. Advantageously, the original equipment manufacturer need only construct one basic assembly, except for the gearing sets themselves, in order to provide many possible ratios of output in either direction of rotation, and the appropriate gearing sets may be readily introduced, either at the factory or by a remote distributor, from among a relatively small stock of such sets to meet the speeds and directions specified for customers' applications.

Although at least a pair of planet and sun gear sets is required in carrying out this invention, it is also feasible to employ one or more additional sets, such as appear in the speed-and-direction shifting device characterized in FIGS. 4 and 5. Components and features of that device which are the functional counterparts of those already described with reference to FIGS. 1–3 are ascribed the same reference characters, with distinguishing single-prime accents being added, and it should be understood that the effects and operative relationships are essentially the same as for the device of FIGS. 1–3, with notable differences as next discussed. The apparatus of FIGS. 4 and 5 includes two sets of sun and planet gears 15' and 16', and 13' and 14', which are generally similar to those identified by like numerals in FIGS. 1–3, except that sun gear 14' is held in a reacting fixed relationship with the housing 10a' only when so held by a locking pin 30 which may mate within an appropriate peripheral opening 30a upon being depressed against opposing bias of a spring 30b by a slidable cam 31a of a shift member 31. In the illustrated construction, the sun gear rollers, such as 16a' shown in FIG. 5, are held within accommodating shaped recesses along the interior of the generally annular or ring-like frame of gear 16', rather than being pinned laterally to one side, and that alternative arrangement lends itself well to the compact annular stacking of several sets of sun and planet gears, including the two further sets comprising planet gears 32 and 33 and the cooperating surrounding sun gears 34 and 35, respectively, in which are disposed the sun-gear rollers 34a and 35a. These two additional sets of sun and planet gears are provided with rollers and lobes of number different from one another and from those of the set involving gears 13' and 14', such that the output speed ratio and/or direction may be changed. All of the planet gears 15', 32, 33 and 13' are angularly fixed together for orbiting in common about the eccentric input axis 17' established by their eccentric crankshaft mounting 7a', which in this instance is made integral with the counterweighting 28a' and 18b' for both that eccentricity and the combined eccentricities of all four planet gears. Shift member 31 is slidable within housing 10a' for selective independent actuations of the other two locking pins, 36 and 37, which, like locking pin 30, may engage and restrain rotation of the sun gears with which they cooperate, 34 and 35. Spacers 38 and 39 maintain the stacked arrays of gears in proper relationship with one another for the intended purposes.

In other apparatus taking advantage of the concepts advanced herein, the sun gear tooth configurations may be of a continuous-tooth form, such as are shown in my U.S. Pat. No. 3,574,489, although rollers or pins are preferred for the aforedescribed embodiments. In the latter connection, it should be noted that the numbers of sun-gear pins or rollers as referred to herein are the predetermined maximum numbers for given circular arrays or patterns in which the pins or rollers are equi-angularly distributed, whereas, in fact, the actual numbers of pins or rollers used may be less, but still located in accordance with such distributions or patterns. For example, with reference to rollers 16a of sungear 16 (FIG. 2), shown as numbering a full twelve in the illustrated pattern or distribution, it is possible to remove many or even most of such rollers and yet the operation as described hereinbefore will occur satisfactorily. The same is true of rollers 14a of sun gear 14; every other one of the 24 rollers may be removed with satisfactory results, for example, and this kind of practice is especially advantageous where the maximum number of rollers for the assigned distribution would otherwise be quite large. The size of rollers does not vary even though the number used is less than the maximum for a given equi-angular distribution, of course. Also, that maximum number, rather than the actual number of pins or rollers used, is in each instance greater by one than the number of lobelike teeth on the cooperating mated planet gear.

In one modification, the paired planet gears may be fashioned from one integral blank, rather than being formed separately and then fastened together; such integral planet gear-pairs are particularly appropriate for use in highly miniaturized versions of the speed reducer, and may conveniently be die-cast, sintered, or injection-molded, for example. Further, the described arrangements which function to reduce speed may also be modified to function as differential transmissions, with one input being to the input shaft, as already discussed, and with a second rotational input being applied to one of the sun gears, the other sun gear then yielding the desired rotational output.

Accordingly, it should be understood that the specific practices and preferred embodiments herein referred to have been offered by way of disclosure rather than limitation, and that various modifications, additions and substitutions may be effected by those skilled in the art without departure from these teachings; it is therefore aimed in the appended claims to embrace all such variations as fall within the true spirit and scope of this invention.

What I claim as new and desire to secure by Letters Patent of the United States is:

1. An orbital drive mechanism comprising two orbiting gears having peripheral surfaces acting as teeth of different numbers, $N_1$ and $N_2$, respectively, means supporting said two orbiting gears for movements together eccentrically about an axis and angularly about their centers eccentric to said axis, two non-orbiting gears concentric with said axis and nested with said two orbiting gears, respectively, said non-orbiting gears having peripheral surfaces acting as teeth and meshed with said teeth of said orbiting gears, the predetermined maximum number of said teeth of the patterns of teeth for said non-orbiting gears each differing by one from the numbers of orbiting gear teeth, $N_1$ and $N_2$, respectively, one of each of the two meshed pairs of orbiting and non-orbiting gears having the teeth thereof in the form of lobes fixed integrally therewith, the surfaces of which lobes have continuous curvature and follow a continuous substantially epitrochoid curvature fully about the periphery of said one of said pairs of gears, the surfaces acting as the teeth of the other of each of the two meshed pairs of gears being of the same circular curvature with all the central axes of their circular curvature lying at a fixed radial distance from a given axis thereof and being located at angular positions of a predetermined pattern of equi-angularly spaced tooth positions around said given axis, said lobes being contoured and disposed relative to said surfaces of circular curvature to develop substantially-continuous rolling - contact relationships between said lobe surfaces and surfaces of all the teeth of circular curvature at all times, and means restraining one of said non-orbiting gears from following angular movements of the orbiting gear meshed therewith, whereby, the ratio of angular velocity of said supporting means to angular velocity of the other of said non-orbiting gears about said axis is substantially to one $$\frac{N_1 (N_2 + 1)}{N_1 - N_2}.$$

2. An orbital drive mechanism as set forth in claim 1 wherein said surfaces of circular curvature acting as said teeth of the other of each of said meshed pairs of gears are formed by cylindrical surfaces of cylindrical members having their central axes held at a fixed radial distance from said given axis and located at said angular positions.

3. An orbital drive mechanism as set forth in claim 2 wherein said cylindrical members are rollers, wherein said rollers form said teeth of both of said non-orbiting gears and are at the same fixed radial distance from said given axis, and wherein the diameters of both of said orbiting gears are the same.

4. An orbital drive mechanism comprising housing members adapted to be joined together to form an enclosure for internal movable parts of said mechanism, bearing means for supporting an input shaft and an output shaft for rotation about a common axis of said enclosure with portions thereof accessible from without said enclosure to apply rotational input to and deliver rotational output from said shafts, respectively, said input shaft having a crankshaft portion for supporting a pair of planet gears thereon for orbital movements together about their centers eccentric to said axis, sets of cooperating gears each including an internal planet gear having external continuous curvature lobe-like teeth following a continuous substantially epitrochoid curvature fully about the periphery thereof and a sun gear fitting in surrounding relation to the planet gear and having surfaces of cylindrical curvature acting as internal teeth, said lobe-like teeth of the planet gear being contoured and disposed relative to said surfaces of cylindrical curvature to develop substantially-continuous rolling-contact relationships with all of said internal teeth at all times, said sets of cooperating gears each having a different number of lobe-like teeth for the planet gears thereof and having predetermined maximum numbers of internal teeth for the patterns of teeth of the cooperating sun gears which exceed by one the numbers of teeth of the planet gears, said sets of cooperating gears having dimensions rendering them physically interchangeable with one another within said enclosure, the planet gears of two of said sets having teeth of numbers $N_1$ and $N_2$, respectively, being supported by said crankshaft portion, means within said enclosure restraining one of the sun gears of said two sets from following angular movements of the planet gear meshed therewith, and means mounting the other of the sun gears of said two sets within said enclosure in angular driving relation to said output shaft about said axis, whereby the ratio of angular velocity of said input shaft to angular velocity of said output shaft about said axis is to one $$\frac{N_1 (N_2 + 1)}{N_1 - N_2}.$$

5. An orbital drive mechanism as set forth in claim 4 wherein surfaces of each of the sun gears of said sets are formed by rollers having their central axes held at the same fixed radial distance from the centers of said sun gears and located at equiangularly spaced positions around said centers, and wherein the diameters of all the planet gears of said sets are the same.

6. An orbital drive as set forth in claim 5 wherein said restraining means comprises means angularly locking said one of the sun gears with said enclosure about said axis, and wherein the same-diameter planet gears of said sets exhibit substantially the same mass eccentricity about their centers, and further comprising counterweight means fixed with said input shaft for rotation therewith proximately with said crankshaft portion thereof within said enclosure, said counterweight means having mass disposed substantially opposite to and in substantially counterbalancing relationship with twice said mass eccentricity of each of said planet gears, whereby said counterweight means counterbalances said input shaft for any combination of two planet gears from among said sets.

* * * * *

UNITED STATES PATENT AND TRADEMARK OFFICE
CERTIFICATE OF CORRECTION

PATENT NO. : 3,998,112
DATED : December 21, 1976
INVENTOR(S) : Michel A. Pierrat It is certified that error appears in the above-identified patent and that said Letters Patent are hereby corrected as shown below:

Claim 1, column 8, line 52:
before "teeth", insert --external--;

Claim 1, column 8, line 57:
after "nested", delete "with" and insert --in surrounding relation to--;

Claim 1, column 8, line 59:
before "teeth", insert --internal--;

Claim 1, column 9, line 18:
delete "to one";

Claim 1, column 9, line 21:

after "$\frac{N_1(N_2+1)}{N_1-N_2}$", insert --to one--.

Claim 4, column 10, line 24:
delete "to one";

UNITED STATES PATENT OFFICE
CERTIFICATE OF CORRECTION

Patent No. __3,998,112__      Dated __December 21, 1976__

Inventor(s) __Michel A. Pierrat__

It is certified that error appears in the above-identified patent and that said Letters Patent are hereby corrected as shown below:

Claim 4, column 10, line 24, after "$\frac{N_1 (N_2+1)}{N_1 - N_2}$" insert -- to one --.

Signed and Sealed this

Sixth Day of September 1977

[SEAL]

Attest:

RUTH C. MASON  
*Attesting Officer*

LUTRELLE F. PARKER  
*Acting Commissioner of Patents and Trademarks*